US010990921B2

(12) United States Patent
Hufschmid et al.

(10) Patent No.: US 10,990,921 B2
(45) Date of Patent: Apr. 27, 2021

(54) INTEGRATED WAREHOUSE MANAGEMENT, SHIPPING, AND INVENTORY CONTROL SYSTEM

(71) Applicant: PACIFIC CARPET DISTRIBUTORS, LLC, Portland, OR (US)

(72) Inventors: David Hufschmid, Newberg, OR (US); Gordon Carter Collett, Beaverton, OR (US)

(73) Assignee: PACIFIC CARPET DISTRIBUTORS, LLC, Portland, OR (US)

( * ) Notice: Subject to any disclaimer, the term of this patent is extended or adjusted under 35 U.S.C. 154(b) by 591 days.

(21) Appl. No.: 15/394,149

(22) Filed: Dec. 29, 2016

(65) Prior Publication Data
US 2017/0185955 A1   Jun. 29, 2017

Related U.S. Application Data

(60) Provisional application No. 62/415,272, filed on Oct. 31, 2016, provisional application No. 62/272,329, filed on Dec. 29, 2015.

(51) Int. Cl.
*G06Q 10/08* (2012.01)
*G06Q 30/04* (2012.01)

(52) U.S. Cl.
CPC ......... *G06Q 10/087* (2013.01); *G06Q 10/083* (2013.01); *G06Q 30/04* (2013.01)

(58) Field of Classification Search
None
See application file for complete search history.

(56) References Cited

U.S. PATENT DOCUMENTS

| 8,266,069 | B2* | 9/2012 | Robinson | G06Q 10/0875 705/332 |
| 2005/0283454 | A1* | 12/2005 | Ricchio | H04L 29/06 |
| 2007/0065979 | A1* | 3/2007 | Huber-Buschbeck | G06Q 10/087 438/106 |
| 2009/0319401 | A1* | 12/2009 | Rao | G06Q 10/087 705/29 |
| 2010/0094676 | A1* | 4/2010 | Perra | G06Q 10/06395 705/7.41 |
| 2010/0262453 | A1* | 10/2010 | Robinson | G06Q 10/0875 705/330 |

OTHER PUBLICATIONS

Bryan Lyng, "3PL SmartPack demo E3 1", digital video, dated Aug. 28, 2015, https://www.youtube.com/watch?v=X0HJN7SH3Q0, Cite No. D001.

(Continued)

*Primary Examiner* — Scott A Zare
(74) *Attorney, Agent, or Firm* — Kolitch Romano LLP

(57) ABSTRACT

A computer-implemented inventory and shipping management system may include a plurality of dedicated modules integrated with a common central data store. The modules may be configured to communicate with each other only through the central data store. Item records may be stored in the central data store, including information relating to a packaging tier structure of each respective item. A user interface for entering inventory information may be dynamically updated by the system based on a selected measurement category.

9 Claims, 12 Drawing Sheets

(56) References Cited

OTHER PUBLICATIONS

Brent Blackmon, "Camelot 3PL software", digital video, dated Aug. 28, 2008, https://www.youtube.com/watch?v=Fyn7c7EIE8k, Cite No. D002.

Infoplus Commerce, "Infoplus Tutorial—Get a Quick Overview of Infoplus", digital video, dated Nov. 24, 2015, https://www.youtube.com/watch?v=IUgZ4uymEJQ, Cite No. D003.

* cited by examiner

130

| items | |
|---|---|
| id | int[10] |
| old_id | int[10] |
| root_item_id | int[10] |
| xid | int[10] |
| tripout_id | int[10] |
| tripout_order | int[10] |
| parent_item_id | int[10] |
| top_parent_id | int[10] |
| inventory_root_flag | smallint[5] |
| item_type_id | int[10] |
| warehouse_id | int[10] |
| location_id | int[10] |
| type_enum | enum[14] |
| unit_measure_id | int[10] |
| status | varchar[100] |
| trip_status | varchar[100] |
| order_status | varchar[100] |
| delivery_priority | enum[13] |
| barcode_num | varchar[50] |
| piece_num | varchar[8] |
| description | varchar[255] |
| date_in | datetime[19] |
| date_in_ovr_flag | bit[0] |
| date_out | datetime[19] |
| date_out_ovr_flag | bit[0] |
| total_packing_tiers | smallint[5] |
| item_cost | float[12] |
| item_sale_price | float[12] |
| item_discount_level | float[12] |
| width | int[10] |
| length | int[10] |
| height | int[10] |
| weight | double[22] |
| pieces_ordered | int[10] |

Fig. 2A (continued from Fig. 2A)

130

| | |
|---|---|
| item_quantity_verified | smallint[5] |
| pieces_onhand | int[10] |
| pieces_sent | int[10] |
| pieces_delivered | int[10] |
| pieces_damaged | int[10] |
| backorder_quantity | int[10] |
| pulled_quantity | int[10] |
| quarantine_quantity | int[10] |
| minimum_units_per | int[10] |
| min_item_type_id | int[10] |
| min_quantity | int[10] |
| mid_large_quantity | int[10] |
| mid_item_type_id | int[10] |
| total_mid_quantity | int[10] |
| large_quantity | int[10] |
| large_item_type_id | int[10] |
| total_large_quantity | int[10] |
| min_restock_quantity | int[10] |
| signature_name | varchar[200] |
| signature_file | varchar[200] |
| signature_date | datetime[19] |
| pin_flag | bit[0] |
| split_flag | bit[0] |
| pick_n_pack_flag | smallint[5] |
| must_ship_by | date[10] |
| created_by | int[10] |
| created_date | datetime[19] |
| modified_by | int[10] |
| modified_date | datetime[19] |
| inactive_flag | bit[0] |

INTEGRATED WAREHOUSE MANAGEMENT, SHIPPING, AND INVENTORY CONTROL SYSTEM

CROSS-REFERENCES

This application claims the benefit under 35 U.S.C. § 119(e) of the priority of U.S. Provisional Patent Application Ser. No. 62/272,329, filed Dec. 29, 2015, and Ser. No. 62/415,272, filed Oct. 31, 2016, the entireties of which are hereby incorporated herein, by reference, for all purposes.

FIELD

This disclosure relates to software systems that are used in the trucking and warehousing industry for supply chain management. More specifically, the disclosed embodiments related to systems and methods for warehouse management, logistics, and inventory control.

INTRODUCTION

Due to the complex nature of modern supply chains, software-based management systems, including cloud-based software systems, are typically used to manage business inventories, logistics, and warehousing activities, as well as related functions. In general, known systems handle portions of the overall operation, relying on the customer business to cobble together multiple solutions that must then communicate with each other, using various interfaces (e.g., API's). This arrangement is inefficient and costly. For example, a software solution may handle warehousing and third party logistics, but fail to provide a robust shipping solution. In some examples, shipping functionality includes only an interlink with shippers such as FedEx and/or UPS. This is less than adequate for businesses that handle even a portion of their own shipping and delivery. Furthermore, known software solutions fail to provide the technical capability to seamlessly mix goods having different packaging measures (e.g., tiered packaging vs. rolled goods) when receiving, shipping, and/or reporting.

Accordingly, a need exists in the industry for a fully integrated software solution that includes both warehousing and shipping functionality, seamless communication between functional modules, and seamless handling of mixed package types.

SUMMARY

Integrated inventory and shipping management systems described herein address the problems outlined above by providing a modular software system in which each isolated module is fully and natively integrated with a common central data store. The central data store may include the capacity to store item records that include a basic packaging measure of the item, such that the system can simultaneously handle differently-packaged goods across multiple functions and reports.

In some embodiments, a system for managing an inventory of goods may include: a plurality of software modules including a warehouse management module, an inventory management module, and a delivery management module all operable within a control framework; a common data store in communication with each of the software modules, such that each of the software modules is in indirect communication with the other software modules only through the data store, the data store being configured to store records associated with pieces of inventory; and a user interface through which an end user can interact with one or more of the plurality of software modules to manipulate the records stored in the data store.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIGS. 2A and 2B, in combination, are a list of fields of an illustrative "items" table suitable for use in a database of a computer-implemented inventory and shipping management system according to the present teachings.

FIG. 8 depicts a first configuration of an illustrative user interface suitable for use in receiving goods using a computer-implemented inventory and shipping management system according to the present teachings.

FIG. 10 depicts a third configuration of the illustrative user interface of FIG. 7.

DESCRIPTION

Figure 1:
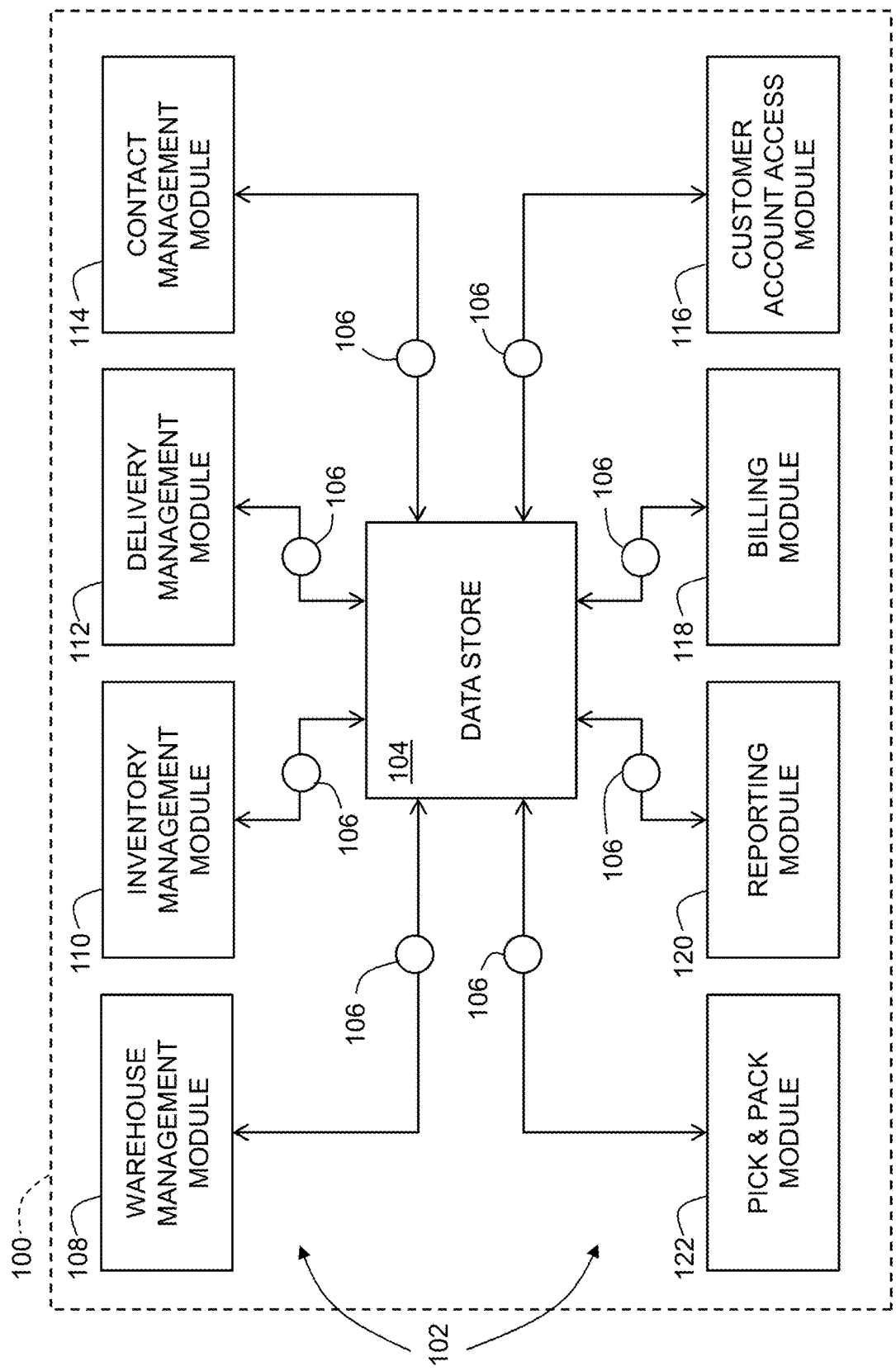
FIG. 1 is a schematic diagram of an illustrative computer-implemented inventory and shipping management system in accordance with aspects of the present disclosure.

Various embodiments of a computer-implemented (e.g., cloud-based) inventory and shipping management system having integrated warehouse management, shipping, inventory control, vendor-managed inventory (VMI), third party logistics (3PL), billing, and/or other administrative functions, as well as related methods, are described below and illustrated in the associated drawings. Unless otherwise specified, the integrated inventory management system and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

In general, an integrated inventory and shipping management system may include a plurality of software modules configured to perform specific functions related to inventory management and the transportation/delivery of inventory pieces. These modules may be modular in the sense that one or more of them may be seamlessly added or removed from the overall system as desired. For example, an end user may not wish to purchase or use a billing module. Accordingly, the billing module may be disabled or disconnected from the remainder of the system (e.g., by changing a software setting) without affecting the functionality of the remaining modules.

Furthermore, the software modules may be integrated in the sense that each of the modules interfaces and communicates with a common central data store or database. Accordingly, any update or change provided by one module will be immediately available to other modules, natively, via the common data store. For example, a delivery module may record the fact that a piece of inventory was delivered to a customer. The updated status and delivery record will be instantly available to a billing module, and corresponding inventory changes will be immediately reflected.

The central data store is configured such that each of the software modules can natively query and update the database, with some record fields being updatable by multiple modules, as needed. For example, a "status" field may be updated by more than one software module (e.g., by both the inventory management module and the delivery management module), rather than each module having a separate, module-exclusive status field that must be managed, communicated, and cross-referenced. Additionally, the record for each item will include information relating to the item type, or packaging measurement category. In other words, some items may be tracked by the roll (e.g., carpets) and have area units (e.g., square yards), while others are packaged hierarchically as eaches (e.g., boxes of nails carried on a pallet). Because the single database record schema can therefore include a mix of package types and item measurement units, the system is capable of receiving, displaying, reporting, and managing inventory and delivery functions seamlessly across any mix of product categories.

Aspects of the cloud-based inventory and shipping management system described herein may be embodied as a computer method, computer system, or computer program product. Accordingly, aspects of the inventory and shipping management system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the inventory and shipping management system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the inventory and shipping management system may be written in one or any combination of programming languages, including an object-oriented programming language such as Java, Smalltalk, C++, PHP, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the inventory and shipping management system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to the present teachings. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary computer-implemented integrated inventory and shipping management systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Illustrative Software System

As shown in FIG. 1, this section describes an illustrative integrated inventory and shipping management system 100. System 100 is an example of the integrated management system described above.

System 100 includes an overall main program to coordinate any suitable number of dedicated software modules 102, each of which is in native communication with a central data store 104. Modules 102 may be added or removed to system 100 by linking or unlinking any given module with respect to data store 104, using any suitable software construct (e.g., a module or framework-level setting). For example, as shown in FIG. 1, each module 102 may include a respective setting, toggle, variable, or flag 106, configured to enable and disable that module with respect to the overall system. In some examples, flag 106 may indicate to the main program that the corresponding module is unavailable, even if the corresponding code physically exists, in which case system 100 will adjust and function as if the module is not present. Any number of software modules 102 may be integrated with data store 104, and each such module may have a corresponding enable/disable flag 106. An interface for providing the subsequently-absent functionality (e.g., an application programming interface or API) may be enabled/surfaced for interfacing with third party modules or software systems whenever a specific native module of system 100 is disabled. Additionally or alternatively, one or more controls (e.g., interface icons, text boxes, etc.) may be exposed to facilitate manual or semiautomated entry and management of the disabled module's functions.

Modules 102 of system 100 are therefore integrated natively with data store 104. However, modules 102 are isolated from each other, such that there is no direct communication between individual modules. Instead, modules 102 each have native access to data store 104, through queries, updates, and the like, and any given module may communicate information—indirectly—to other modules through the data store. For example, a value in an inventory record field may be updated by one module, and that information will be instantly available to all other native modules 102 connected to the data store.

Figures 3, 4:
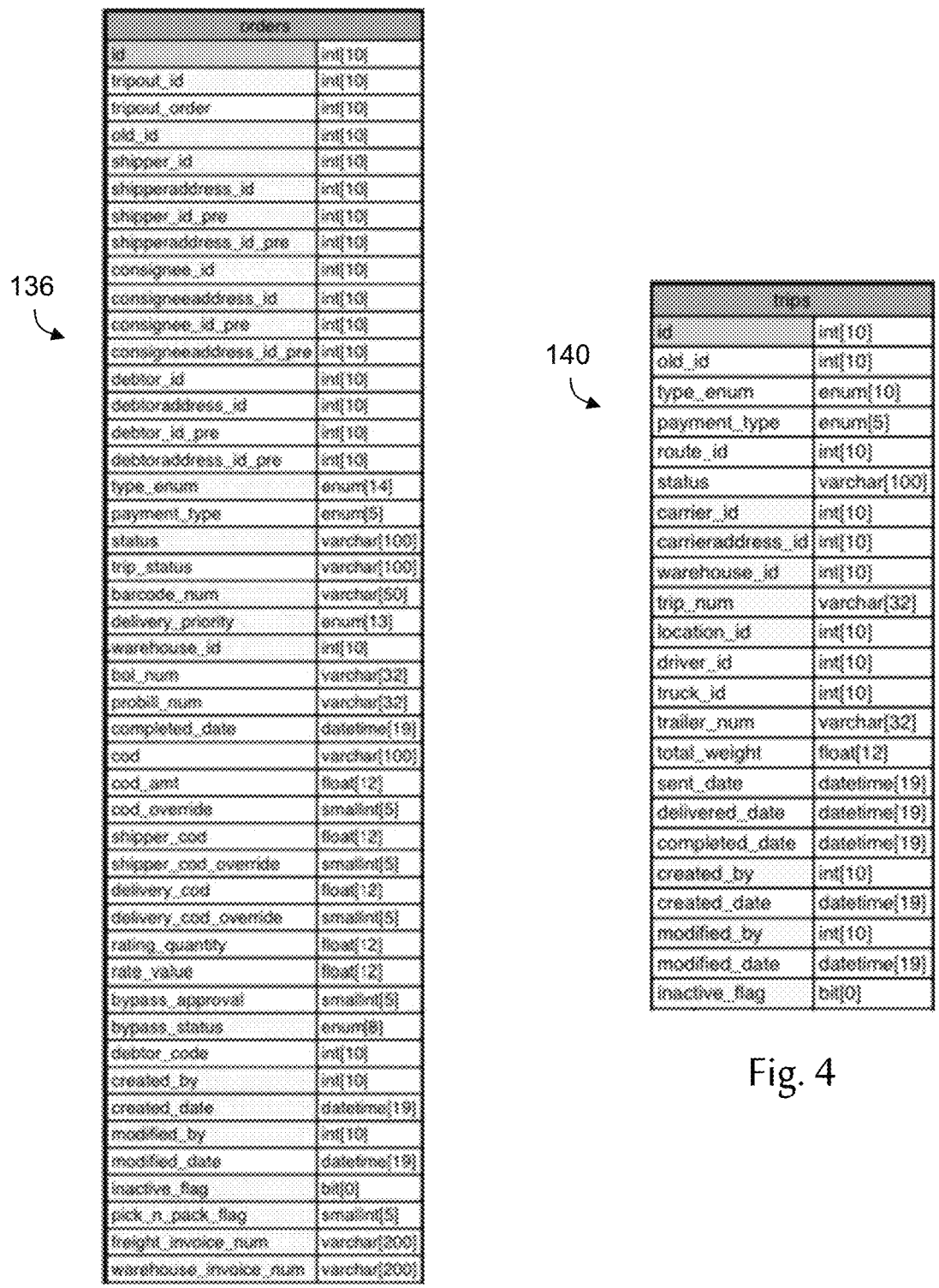
FIG. 3 is a list of fields of an illustrative "orders" table suitable for use in a database of a computer-implemented inventory and shipping management system according to the present teachings.
FIG. 4 is a list of fields of an illustrative "trips" table suitable for use in a database of a computer-implemented inventory and shipping management system according to the present teachings.

Data store 104 may include any suitable data repository or database capable of storing information in a correlated manner. For example, data store 104 may include one or more relational databases. In some examples, data store 104 may include a mySQL database. In some examples, data store 104 includes a relational database built around three main tables: an Items table for fields associated with each inventory item, an Orders table for fields associated with items grouped into orders for shipping or pick-up, and a Trips table for fields associated with the loading, routing, and delivery of items. A portion of an illustrative schema for such a database is included as an items table 130 depicted in FIGS. 2A and 2B, an orders table 136 depicted in FIG. 3, and a trips table 140 depicted in FIG. 4. Various other related tables, supporting information, and relationships may be included in data store 104, such as a table of zip codes vs. delivery routes, and a table of contact information for consignees and/or customers. Any suitable combination of data store elements may be utilized.

Software modules 102 may each include any suitable combination of software, firmware, and/or hardware functionality configured to perform a selected, dedicated function or group of related functions. For example, as shown in FIG. 1, software modules 102 may include a warehouse management module 108, an inventory management module 110, a delivery management module 112, a contact management module 114, a customer account access module 116, a billing module 118, a reporting module 120, and/or a pick and pack module 122.

Warehouse management module 108 may include any suitable module 102 configured to provide incoming trip creation (e.g., automatically from XML or other Electronic Data Interface (EDI) via FTP or similar data transfer mechanism); track trips, orders, pieces; provide barcode functionality; generate reports; handle overage/shortage/damage (OSD) tracking; automate OSD notification (e.g., via email); provide electronic signature capture for proof of delivery; management of multiple warehouses; and/or the like, or any combination of these.

Inventory management module 110 may include any suitable module 102 configured to create inventory records from incoming orders; monitor, track, and control inventory on hand, pulled for orders, back ordered, quarantined, etc.; track "ship by" or perishable dates; track billable services events; provide automatic notification of low inventory levels; and/or the like, or any combination of these.

Delivery management module 112 may include any suitable module 102 configured to provide delivery-related functions for will-call pick-ups and for delivery via trucking. Will call functions may include order creation, electronic signature capture, scanning onto customer's vehicle, and/or the like, or any combination of these. Trucking functions may include trip creation and processing by zip code, load and driver manifest creation, blind trip handling, cross dock, signature capture via driver tablet, OSD tracking, and/or the like, or any combination of these.

Pick and pack module 122 may include any suitable module 102 configured to create orders to be delivered from inventory, grant customer/consignee remote access to inventory, and/or the like, or any combination of these.

Each module 102 may include a user interface (UI) and a set of functions specific to the intended use. As explained above, an end user may input, change, or delete data through any given module, which will in turn update data store 104 accordingly.

In some examples, billing module 118 functions as the interface between system 100 and one or more external billing and/or accounting software packages, such as Quickbooks. Module 118 uses the connected billing software's API to interact with the billing package and share data as needed. In these examples, system 100 gathers all billing events within modules 102, such as warehouse services, freight delivery services, pick-and-pack inventory services, freight packaging labor and materials, and any other process or material that may be billed to the customer. These billing events are then placed into a file constructed to the rules of the particular API being utilized, e.g., the API for Quickbooks, or stored in a standardized file such as comma-separated values (CSV) or Excel, which are readable by the Quickbooks program. This file may then be imported into the Quickbooks or equivalent software program. In this example, the billing software package conducts the actual billing process.

In some examples, software code and data storage associated with system 100 may be stored and/or executed in a distributed system architecture configured to balance load and provide both application and database redundancy for the integrated inventory and shipping management system. In general, data store 104 may include a database located on an isolated database server. A backup copy of the database may be maintained, which may include any suitable mirroring, copy, or duplicate of the data store, and which may be physically located on a different server and/or in a different geographical location. The backup copy may be generated on a periodic basis, such as hourly, daily, or weekly, as desired. Additionally or alternatively, a load balancer may divide usage between two or more application servers. Each application server is independently operable, such that each server can take over the full load if the other server is down.

Illustrative Work Flow

Figure 5:
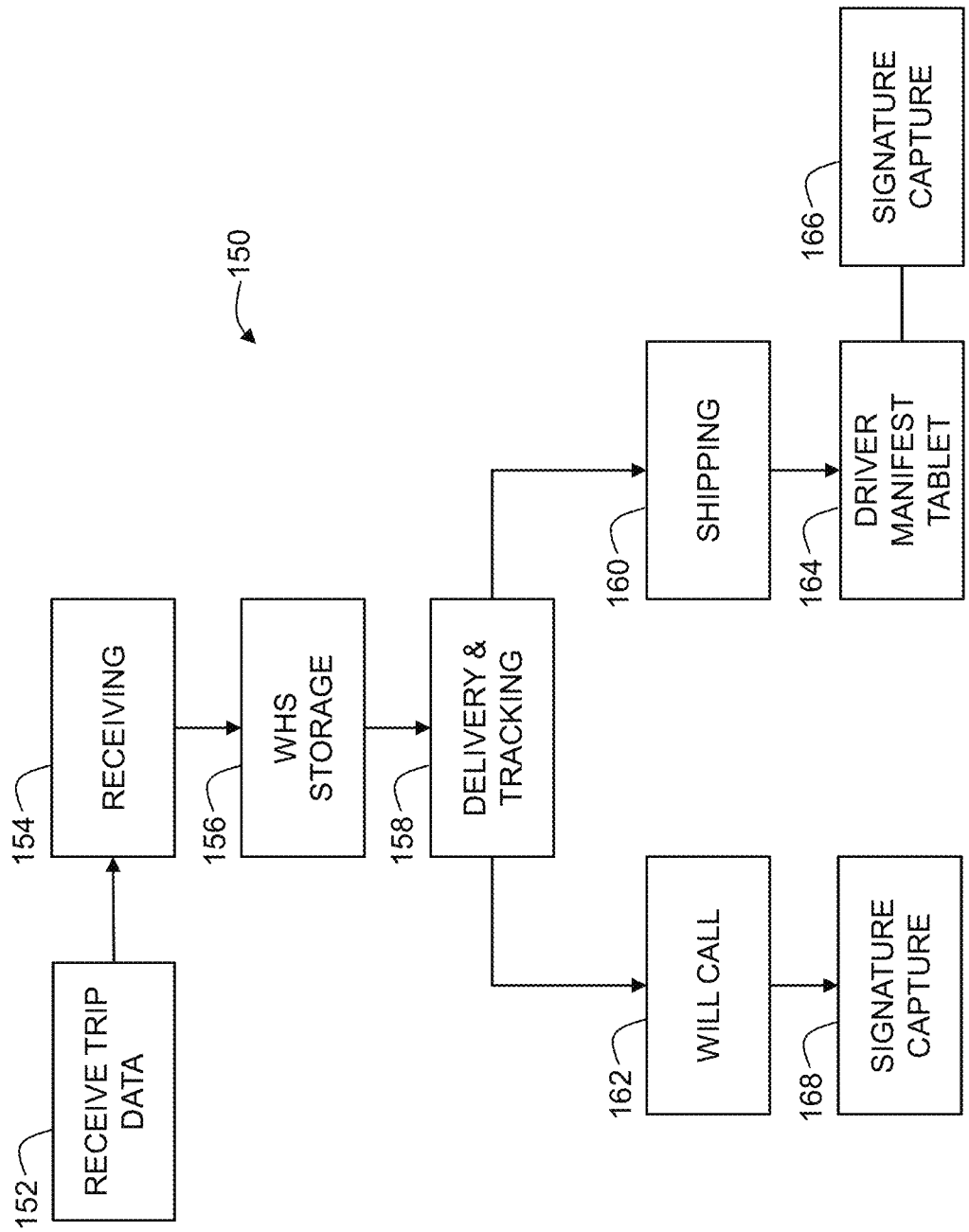
FIG. 5 is a flowchart depicting steps in an illustrative method for receiving and delivering goods using an illustrative computer-implemented inventory and shipping management system in accordance with aspects of the present disclosure.

As shown in FIG. 5, this section describes an illustrative work flow process 150 suitable for use with an integrated inventory and shipping management system such as system 100, in accordance with aspects of the present disclosure.

At step 152, incoming trip data may be received by system 100. Trip data may include information typically found in a bill of lading (BOL), and may represent a number of pieces of inventory being delivered by a supplier to the end user. BOL information (i.e., trip data) may be received in a number of ways. For example, trip data may be transmitted by a supplier and received by system 100 using electronic data interface (EDI) systems. This sort of information would be automatically or semi-automatically entered into data store 104. In some examples, trip data may be provided electronically, such as via an XML file. This data may be uploaded to data store 104 by the end user or through automatic systems, depending on how it is received. In some examples, trip data may come in the form of hard copy records, such as a paper-based BOL form. In these examples, trip data must be entered by hand into system 100 by the end user.

At step 154, the end user's receiving department (or the equivalent) may physically receive the inventory pieces listed on the trip data received in step 152. This step may include scanning (e.g., bar code scanning) each piece into the system, which may update the data store to reflect that the inventory piece has been verified as received. For this and other steps, a portable electronic device in communication with system 100 may include bar code scanning capability. The portable device may also have software capabilities for running or interfacing with certain modules 102.

At step 156, the pieces received in preceding steps may be placed into warehouse storage. Locations for each piece may be recorded and stored in data store 104. For example, the portable electronic device may be used to scan each piece into a specific warehouse location (which may also have an associated bar code). System 100 may accommodate multiple warehouses each having multiple locations. Moves between locations and warehouses may be recorded via warehouse management module 108.

At step 158, if a piece is to be transferred to a customer, delivery management module 112 may be used to set up and manage the delivery. In general, two options are available at this phase of operations. The end user may ship/deliver the piece(s) to the customer, at step 160, or the customer may come to the end user's location to pick up the required piece(s), in a "will call" step indicated at 162.

If the end user will be delivering the piece(s), step 160 may include assigning the piece(s) to a geographically-grouped delivery route, properly loading a delivery vehicle, and scanning of the piece(s) onto the vehicle.

If the customer will be calling to pick up the requested piece(s), step 162 may include gathering and transferring the piece(s) to the customer when the customer arrives. In either delivery step, the respective status of the piece(s) in question will be updated automatically in data store 104, making such information immediately available to other modules.

If the shipment is to be delivered, step 164 may include a device (e.g., an electronic tablet) that runs a driver manifest. The driver manifest provides information to the delivery driver regarding where to deliver goods, and transfers the piece(s) to the customer in the system upon reaching the correct destination.

Steps 166 and 168 include gathering signature information upon delivery. The end user's "will-call" clerk or delivery person has access to a portable tablet (e.g., an android-based or iOS-based tablet with touch screen capabilities). This tablet is in communication with system 100, and may be used to capture the signature of whoever takes possession of the delivered piece(s). In the case of a delivery, this signature capture may be part of step 164, and may be performed using the same tablet. In either case, an electronic image of the signature will be captured by the tablet, and immediately uploaded to data store 104 and associated with the piece, order, and/or any other related information. Accordingly, an image of the receipt signature will be immediately accessible by any other module or user of the system.

Illustrative Method

This section describes steps of illustrative methods 200 and 250 for handling the receiving and shipping of items having a plurality of packaging modalities, using an integrated inventory and shipping management system, such as system 100; see FIGS. 6-11. Aspects of system 100 may be utilized in the method steps described below. Where appropriate, reference may be made to components and systems that may be used in carrying out each step. These references are for illustration, and are not intended to limit the possible ways of carrying out any particular step of the method.

Figure 6:
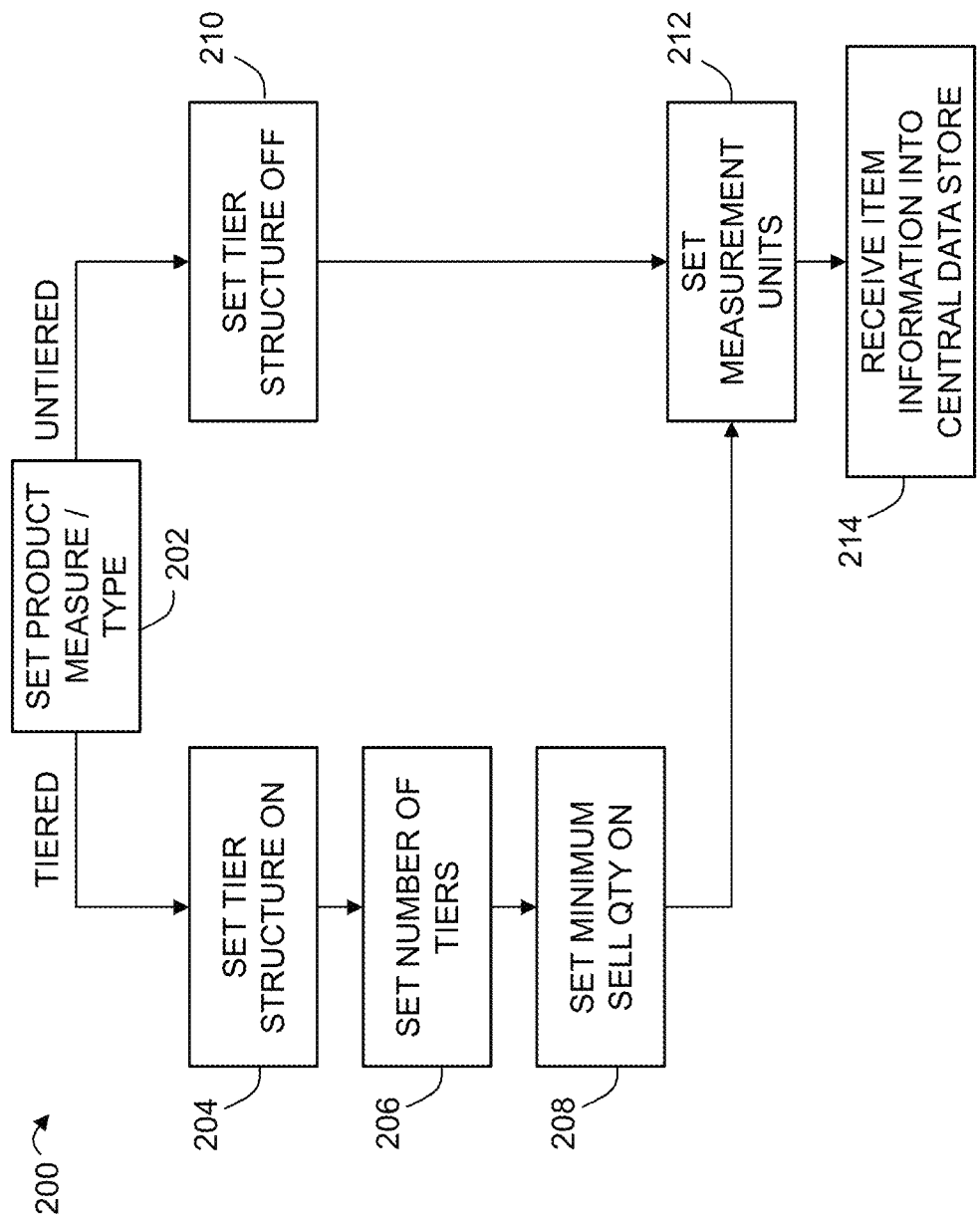
FIG. 6 is a flowchart depicting steps in an illustrative method for receiving goods using an illustrative user interface of a computer-implemented inventory and shipping management system in accordance with aspects of the present disclosure.
Figure 7:
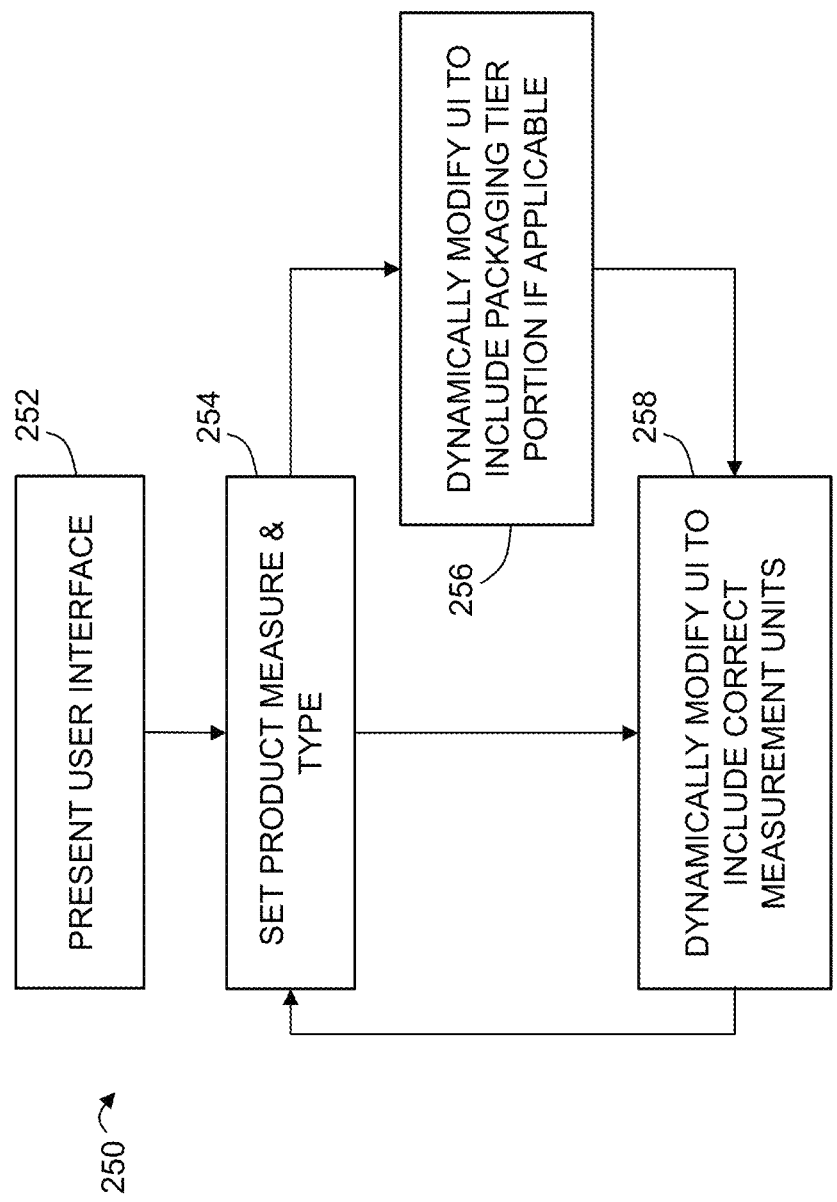
FIG. 7 is a flowchart depicting steps in an illustrative method for dynamically updating a user interface of a computer-implemented inventory and shipping management system in accordance with aspects of the present disclosure.

FIGS. 6 and 7 are flowcharts illustrating steps performed in illustrative methods, some or all of which may be combined and/or performed in tandem, and in either case may not recite the complete process or all steps of the method. Although various steps of methods 200 and 250 are described below and depicted in FIGS. 6 and 7, the steps need not necessarily all be performed, and in some cases may be performed in a different order than the order shown.

Figure 8:
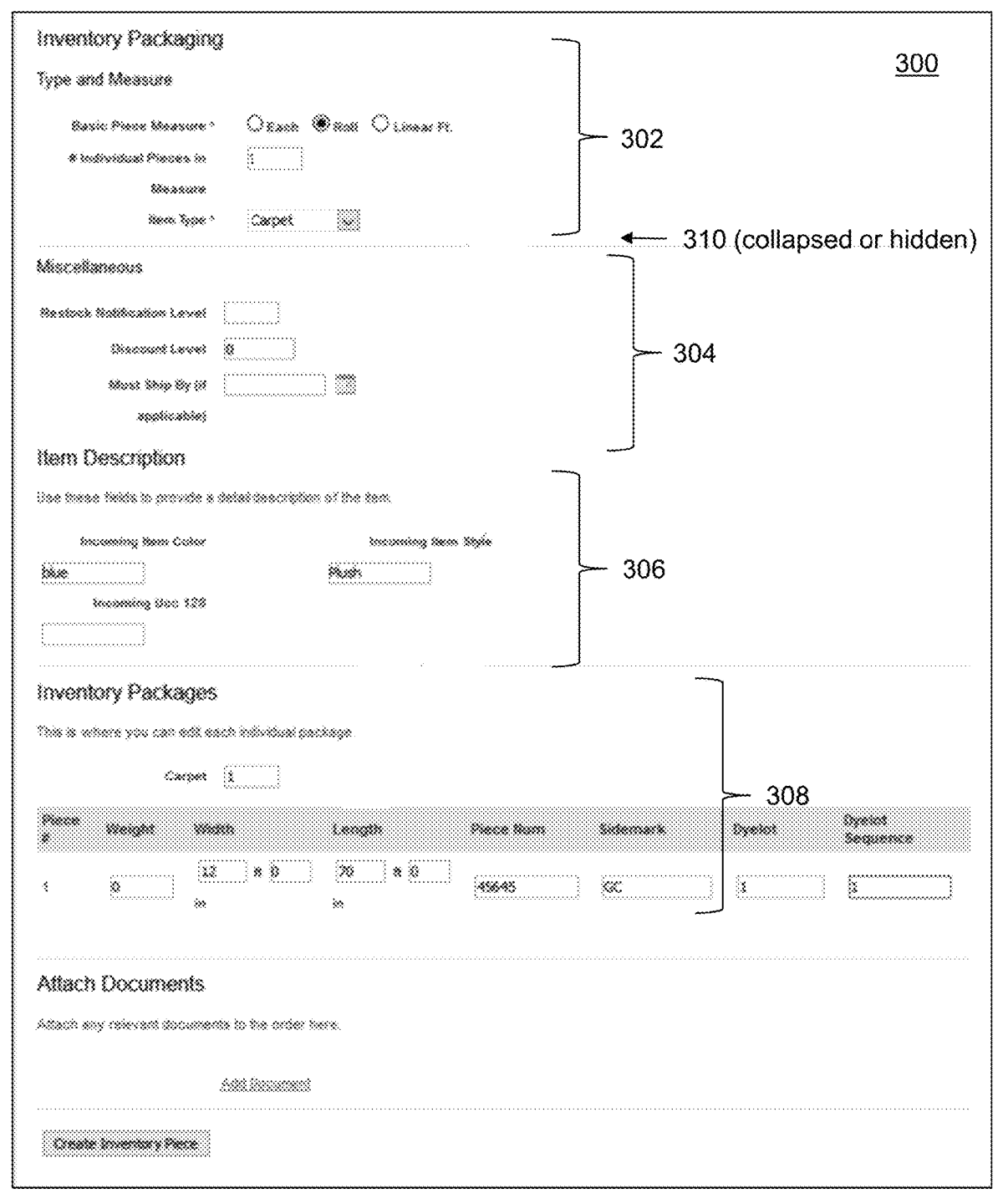
Figure 9:
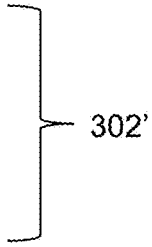
FIG. 9 depicts a second configuration of the illustrative user interface of FIG. 7.
Figure 10:
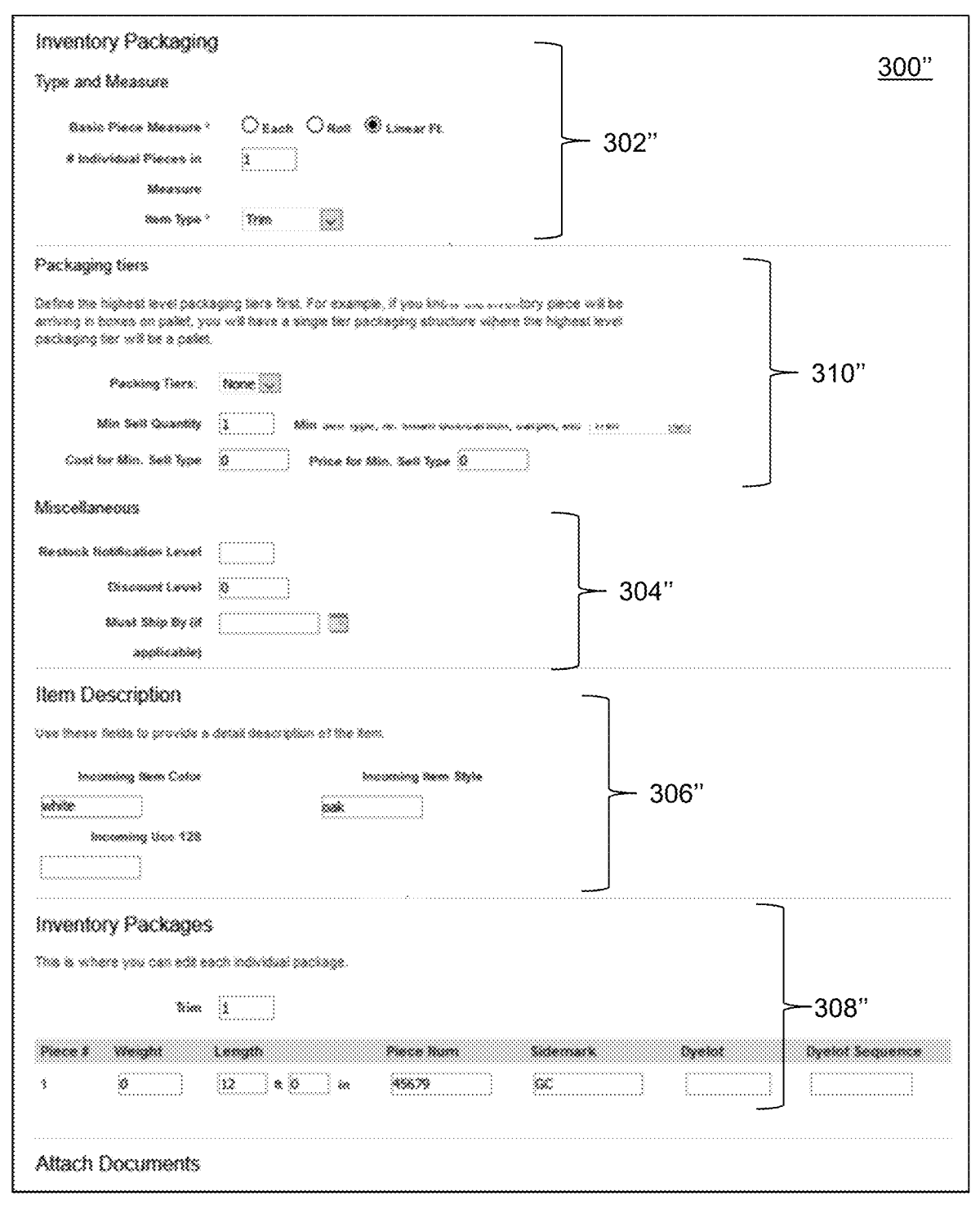

Method 200 is a computer-implemented method for receiving items of various packaging categories and measurement schemes into a single inventory system using an integrated system such as system 100. A user participating in method 200 may interact with a user interface (UI) 300, e.g., a graphical user interface (GUI), an example of which is shown in FIGS. 8-10. As described further below, UI 300 comprises a dynamic user interface that adjusts automatically depending on the type of item being added. Briefly describing each section or portion of UI 300, a first portion 302 includes selectable and interactive elements for entering item type and basic measure information (e.g., measurement category), a second portion 304 includes selectable and interactive elements for entering miscellaneous information, e.g., restock notification levels, a third portion 306 includes selectable and interactive elements for entering more detailed information, and a fourth portion 308 includes data entry fields for editing each individual package/item being entered. A fifth portion 310 includes selectable and interactive elements for entering packaging tier information, and is selectively displayed by the system, depending on whether the selected basic piece measure is hierarchical or tiered in nature. Reference numerals for the various sections are primed in FIG. 9, and double-primed in FIG. 10, for clarity.

At step 202 of method 200, a product or item measure and type may be set, such as by receiving selected information from the user through interface 300. For example, as shown in FIG. 8, a user may select from predetermined choices of basic piece measures (also referred to as measurement categories) in portion 302 of UI 300. In this example, measurement categories include "each" (e.g., nails, tile squares), "roll" (e.g., carpet, linoleum), and "linear feet" (e.g., trim, molding). Also, as shown in FIG. 8, the user can indicate the number of individual pieces that are included in the basic piece measure, as well as selecting from a pre-populated list of item types (e.g., cartons, trim, carpet, etc.).

At step 204, if the selected basic piece measure (i.e., measurement category) is hierarchical or tiered, a variable or flag of system 100 is set to indicate that a tiered structure is present. For example, items that are measured as eaches will be packaged and shipped in hierarchical packaging, such as in cartons or boxes, which in turn are stacked on pallets. In another example, items that are measured linearly (e.g., linear feet) are also assumed to be shipped and carried in tiers, such as in a bundle or box of eight-foot oak trim pieces.

At step 206, a number of such tiers is set, based on input from the user. For example, an item that is shipped in buckets stacked on a pallet will have one tier. In another example, an item that is shipped in boxes of 10 that are packed in crates, which in turn are stacked on a pallet, will have two tiers. In some examples, pieces of inventory may be shipped individually, in which case the number of tiers is set to zero. Other tier information is collected, such as the number of packages in each tier, and what the tier unit of measurement is (e.g., pallet). This information is gathered through UI 300 in portion 310 (see portions 310' and 310" of FIGS. 9 and 10, respectively).

At step 208, a minimum sell quantity is set, based again on user input. The minimum sell quantity is the smallest number of pieces allowed to be sold at once. For example, it may be the case that at least two buckets of mortar should always be sold, or that the buckets of mortar should always be sold in pairs.

At step 210, if the selected basic piece measure is untiered (i.e., non-hierarchical), the variable or flag of system 100 is set to indicate that a tiered structure is not present (e.g., the flag is unset). For example, carpets are generally shipped and stored in rolls, rather than boxes, etc. Accordingly, additional information on tier structure is not collected or necessary. As shown in FIG. 8, this is reflected in UI 300, in that portion 310 is hidden, collapsed, or unexpanded.

In all cases, at step 212, the measurement units for the item are set automatically by the system, based on the basic piece measure selected in step 202. For example, if the basic piece is "each," then the measurement units are set to a weight. For example, if the basic piece is "roll," then the measurement units are set to a width and length. For example, if the basic piece is "linear feet," then the measurement units are set to a length.

At step 214, additional information is received, e.g., from portion 308 of UI 300, and the item(s) are added into the central data store. As part of the dynamic nature of UI 300, fields of portion 308 are customized based on information received in previous steps. This streamlines data entry, reduces confusion, and aids in error-proofing.

Turning to FIG. 7, method 250 is a computer-implemented method for dynamically updating a user interface for receiving items of various packaging and measurement schemes into a single inventory system using an integrated system such as system 100. With continuing reference to FIGS. 8-10, method 250 may be used with UI 300.

Step 252 of method 250 includes presenting a graphical user interface (e.g., UI 300) to the user. As described above, the UI may include any suitable number of sections or portions, one or more of which is dynamically hidden or shown, depending on information received or options selected by the user.

Step 254 of method 250 includes setting the product type and basic piece measure, which corresponds to step 202 of method 200. Based on the basic piece measure selected, step 256 will dynamically modify the UI to include packaging tier portion (e.g., portion 310, 310', 310"), as needed. Based on the unit of measure set in step 212 of method 200, other UI elements may be dynamically updated in step 258. For example, fields may be presented for entering width and length information when a roll of carpet is being entered. Unnecessary, non-applicable, or extraneous information may be excluded, thereby assisting the user in entering accurate and complete information in a non-confusing manner. Although eaches, rolls, and linear feet are used in this example, any suitable hierarchical measurement or categorization system can be used within the scope of the present disclosure.

Known Pick and Pack systems for preparing for incoming inventory products are cumbersome and confusing. The primary reason for this is that many different product types may be incoming on the same trip. For instance, one could have rolls of carpet or vinyl, linear measurements of trim, and/or pallets containing any types of product from buckets of mortar to cases of boxes of nails. Typical UI's can be very confusing and error prone as users continually mix up products with incoming packaging types and measurements. Systems according to the present disclosure greatly simplify this data entry process with an intelligent UI (e.g., UI 300) that adapts to the type of incoming product, and only asks for the data to be entered for that respective product type, instead of the user trying to figure out what input fields go with what product type.

Figure 11:
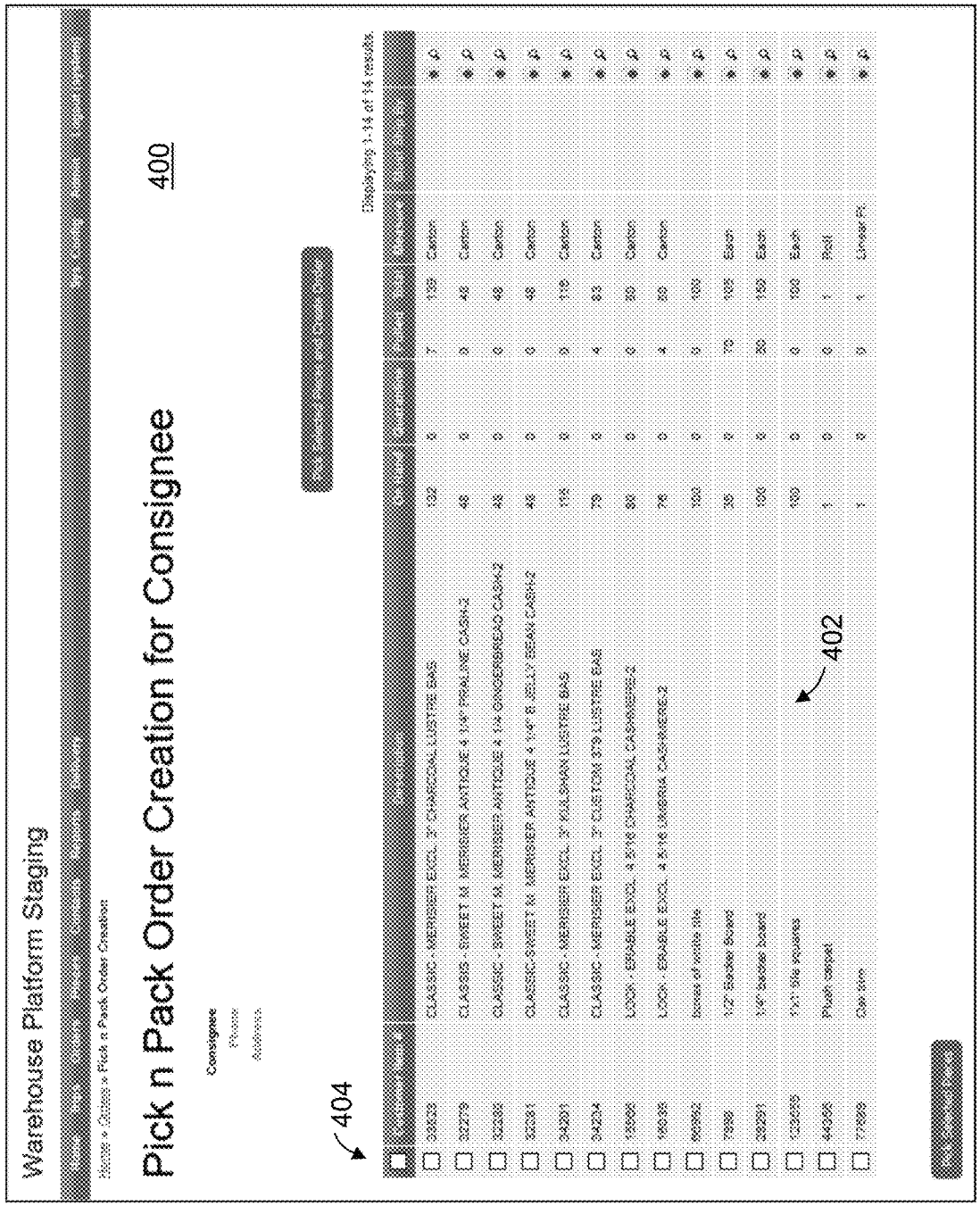
FIG. 11 depicts an illustrative pick and pack user interface screen suitable for use in a computer-implemented inventory and shipping management system according to the present teachings.

Turning now to FIG. 11, another illustrative user interface 400 for a Pick and Pack module (e.g., module 122) is shown, illustrating among other things how the basic piece measure, tiering, and item type information are used to seamlessly display and report inventory items having various packaging types and tiering levels in a single table 402. Other reports and interfaces may utilize this functionality, such as a bill of lading (BOL).

With continuing reference to FIG. 11 as an illustrative example, aspects of an illustrative Pick and Pack module will now be explained in further detail. Typically, Pick and Pack is a process in which a warehouse stores inventory of various items for a consignee, and then that consignee allows its own customers to place orders from that inventory. These orders are then packaged and delivered, either via Will Call or truck delivery to the end customer.

The items stored for such customers are usually single parts, i.e., not an assembly of parts. However, in some examples, consignees wish to deliver assemblies to their customers as well as just the individual parts. Accordingly, Pick and Pack may include the capability to create and edit assemblies from existing inventory, and to allow orders to be created for these assemblies. From a table such as table 402, orders can be created from this inventory for the consignee's customers by selecting the inventory (e.g., selecting from checkboxes 404) of the items to be ordered and then, e.g., clicking on the "Pick Selected Pieces and Create Order" button.

However, if a number of items in the inventory table are selected, and then choose to "Create Assembly" (e.g., from an Action menu, not shown), a new page is displayed in which the user can select the number of each of the items that go into an assembly and then assign a Customer Item Number and Description to that new assembly. The user may then enter the number of assemblies to place in inventory. The system will generate an error message if there are not enough inventory items to create the requested number of assemblies. Orders can then be created in the normal way for assemblies by just selecting the assembly or assemblies desired for the order and then clicking on the "Pick Selected Pieces and Create Order" button.

Illustrative Data Processing System

Figure 12:
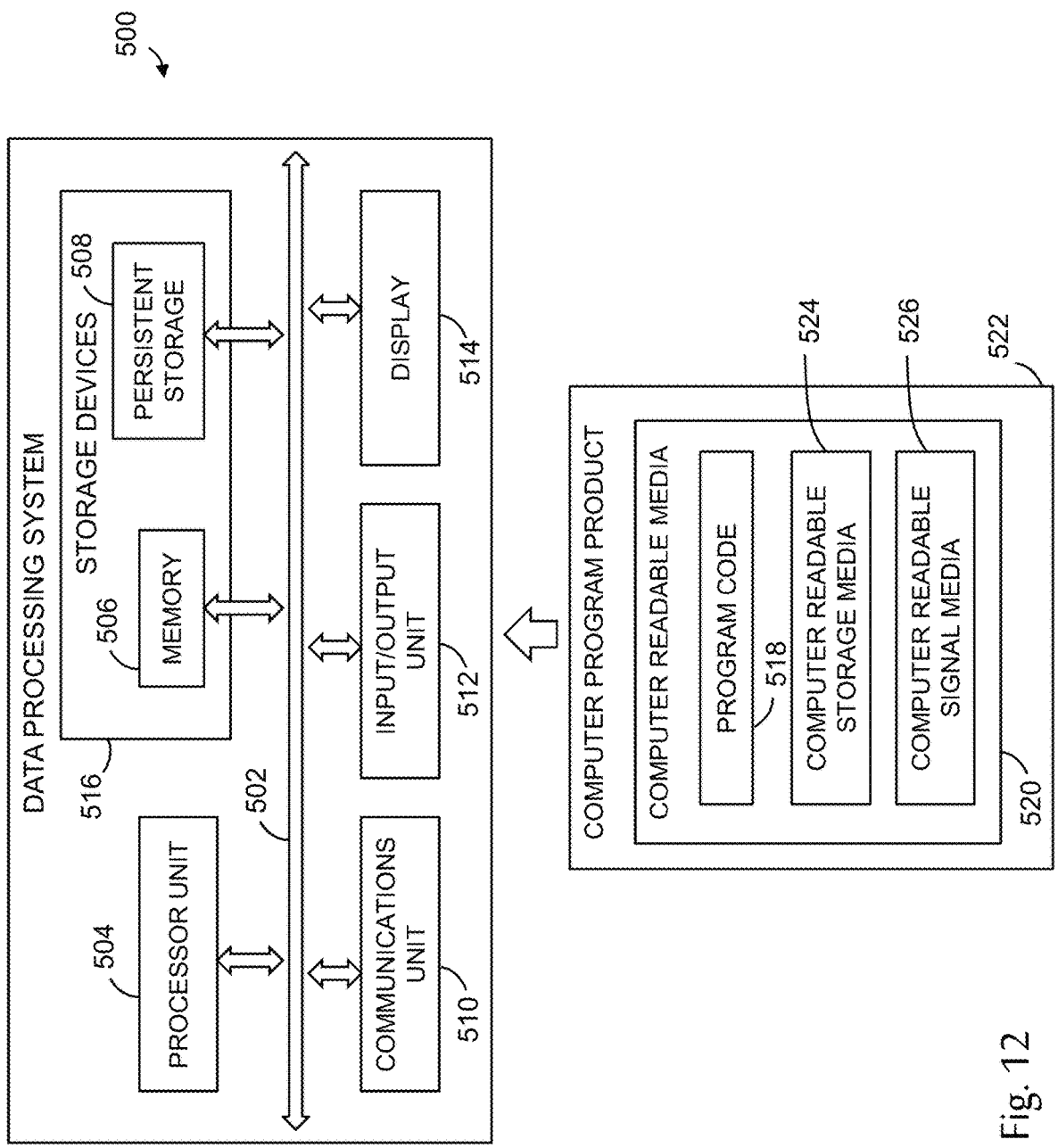
FIG. 12 is a schematic diagram of an illustrative data processing system suitable for use with or inclusion in a computer-implemented inventory and shipping management system according to the present teachings.

As shown in FIG. 12, this example describes a data processing system 500 (also referred to as a computer) in accordance with aspects of the present disclosure. In this example, data processing system 500 is an illustrative data processing system suitable for implementing aspects of the inventory control and shipping system described above. More specifically, in some examples, devices that are embodiments of data processing systems (e.g., smart phones, tablets, servers, personal computers) may be suitable for displaying, interacting with, storing, managing, and/or coordinating a system such as that described with respect to FIGS. 1-11 and/or for running computer programs (e.g., system modules 102 and/or the overall framework in which modules 102 operate) such as those described above, as well as computer-implemented methods.

In this illustrative example, data processing system 500 includes communications framework 502. Communications framework 502 provides communications between processor unit 504, memory 506, persistent storage 508, communications unit 510, input/output (I/O) unit 512, and display 514. Memory 506, persistent storage 508, communications unit 510, input/output (I/O) unit 512, and display 514 are examples of resources accessible by processor unit 504 via communications framework 502.

Processor unit 504 serves to run instructions that may be loaded into memory 506. Processor unit 504 may be a number of processors, a multi-processor core, or some other type of processor, depending on the particular implementation. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and other suitable information either on a temporary basis or a permanent basis.

Storage devices 516 also may be referred to as computer-readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output (I/O) unit 512 allows for input and output of data with other devices that may be connected to data processing system 500. For example, input/output (I/O) unit 512 may provide a connection for user input through a keyboard, a mouse, and/or some other suitable input device. Further, input/output (I/O) unit 512 may send output to a printer. Display 514 provides a mechanism to display information to a user.

Instructions for the operating system, applications, and/or programs may be located in storage devices 516, which are in communication with processor unit 504 through communications framework 502. In these illustrative examples, the instructions are in a functional form on persistent storage 508. These instructions may be loaded into memory 506 for execution by processor unit 504. The processes of the different embodiments may be performed by processor unit 504 using computer-implemented instructions, which may be located in a memory, such as memory 506.

These instructions are referred to as program instructions, program code, computer usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these examples. In one example, computer-readable media 520 may be computer-readable storage media 524 or computer-readable signal media 526.

Computer-readable storage media 524 may include, for example, an optical or magnetic disk that is inserted or placed into a drive or other device that is part of persistent storage 508 for transfer onto a storage device, such as a hard drive, that is part of persistent storage 508. Computer-readable storage media 524 also may take the form of a persistent storage, such as a hard drive, a thumb drive, or a flash memory, that is connected to data processing system 500. In some instances, computer-readable storage media 524 may not be removable from data processing system 500.

In these examples, computer-readable storage media 524 is a physical or tangible storage device used to store program code 518 rather than a medium that propagates or transmits program code 518. Computer-readable storage media 524 is also referred to as a computer-readable tangible storage device or a computer-readable physical storage device. In other words, computer-readable storage media 524 is a media that can be touched by a person.

Alternatively, program code 518 may be transferred to data processing system 500 using computer-readable signal media 526. Computer-readable signal media 526 may be, for example, a propagated data signal containing program code 518. For example, computer-readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer-readable signal media 526 for use within data processing system 500. For instance, program code stored in a computer-readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 12 can be varied from the illustrative examples shown. The different embodiments may be implemented using any hardware device or system capable of running program code. As one example, data processing system 500 may include organic components integrated with inorganic components and/or may be comprised entirely of organic components excluding a human being. For example, a storage device may be comprised of an organic semiconductor.

In another illustrative example, processor unit 504 may take the form of a hardware unit that has circuits that are manufactured or configured for a particular use. This type of hardware may perform operations without needing program code to be loaded into a memory from a storage device to be configured to perform the operations.

For example, when processor unit 504 takes the form of a hardware unit, processor unit 504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 518 may be omitted, because the processes for the different embodiments are implemented in a hardware unit.

In still another illustrative example, processor unit 504 may be implemented using a combination of processors found in computers and hardware units. Processor unit 504 may have a number of hardware units and a number of processors that are configured to run program code 518. With this depicted example, some of the processes may be implemented in the number of hardware units, while other processes may be implemented in the number of processors.

In another example, a bus system may be used to implement communications framework 502 and may be comprised of one or more buses, such as a system bus or an input/output bus. Of course, the bus system may be implemented using any suitable type of architecture that provides for a transfer of data between different components or devices attached to the bus system.

Additionally, communications unit 510 may include a number of devices that transmit data, receive data, or both transmit and receive data. Communications unit 510 may be, for example, a modem or a network adapter, two network adapters, or some combination thereof. Further, a memory may be, for example, memory 506, or a cache, such as that found in an interface and memory controller hub that may be present in communications framework 502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Illustrative Distributed Data Processing System

Figure 13:
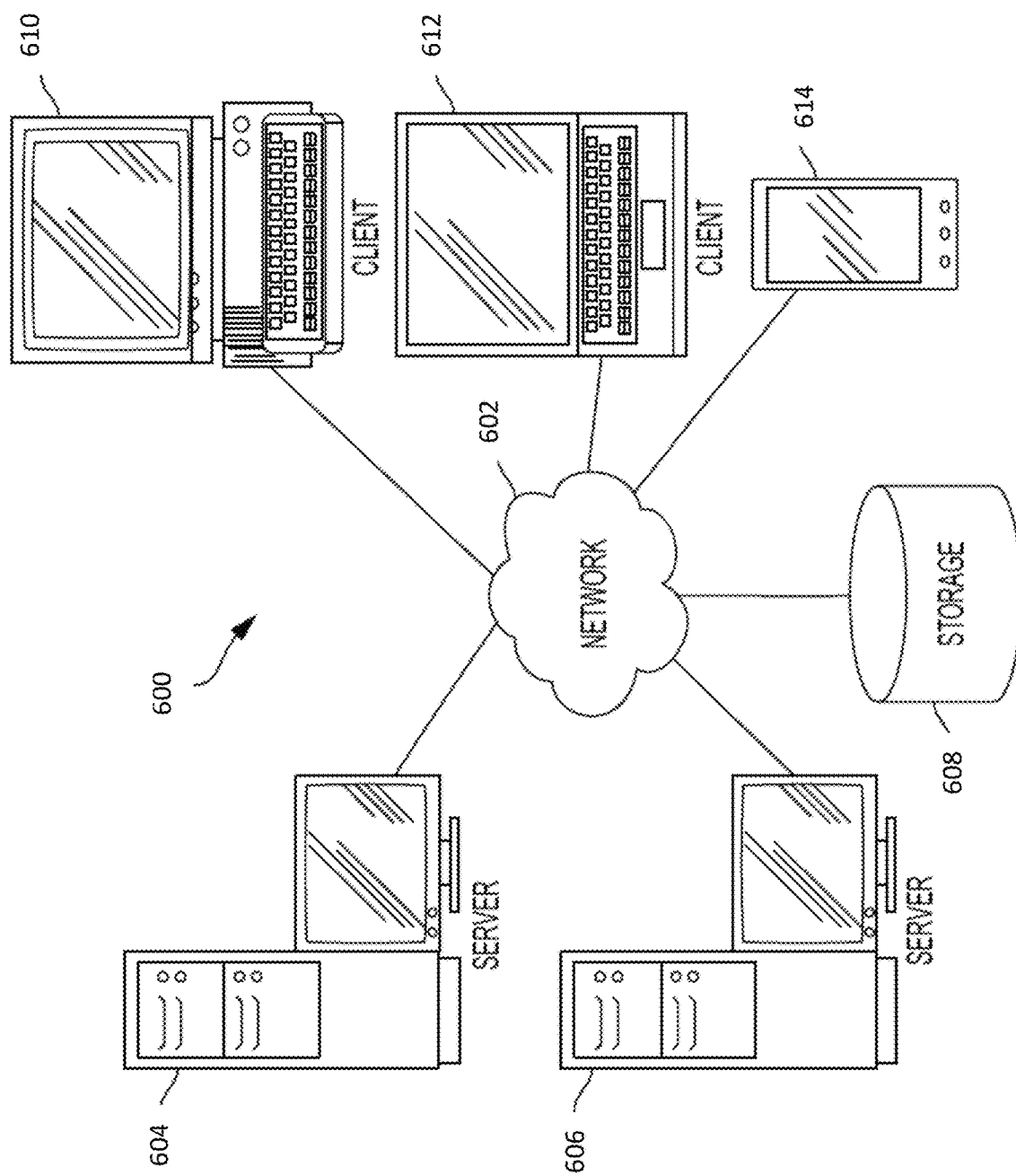
FIG. 13 is a schematic diagram of an illustrated distributed data processing system suitable for use with or inclusion in a computer-implemented inventory and shipping management system according to the present teachings.

As shown in FIG. 13, this example describes a general network data processing system 600, interchangeably termed a network, a computer network, a network system, a distributed data processing system, a "cloud," or a distributed network, aspects of which may be included in one or more illustrative embodiments of an inventory and shipping management system in accordance with aspects of the present disclosure. For example, a mobile device may be connected to servers or other devices which may provide data to the mobile device for use in a delivery management module.

One or more modules of system 100, or portions thereof, may be stored and/or executed on or over the network. Similarly, the data store or portions thereof may be stored and accessed remotely on the network, e.g., in a distributed and/or redundant manner.

It should be appreciated that FIG. 13 is provided as an illustration of one implementation and is not intended to imply any limitation with regard to environments in which different embodiments may be implemented. Many modifications to the depicted environment may be made.

Network data processing system 600 is a network of computers, each of which is an example of data processing system 500, and other components. Network data processing system 600 may include network 602, which is a medium configured to provide communications links between various devices and computers connected together within network data processing system 600. Network 602 may include connections such as wired or wireless communication links, fiber optic cables, and/or any other suitable medium for transmitting and/or communicating data between network devices, or any combination thereof.

In the depicted example, a first network device 604 and a second network device 606 connect to network 602, as does an electronic storage device 608. Network devices 604 and 606 are each examples of data processing system 500, described above. In the depicted example, devices 604 and 606 are shown as server computers. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 610, a client laptop or tablet 612, and/or a client smart device 614, may connect to network 602. Each of these devices is an example of data processing system 500, described above regarding FIG. 12. Client electronic devices 610, 612, and 614 may include, for example, one or more personal computers, network computers, and/or mobile computing devices such as personal digital assistants (PDAs), smart phones, handheld gaming devices, wearable devices, and/or tablet computers, and the like. In the depicted example, server 604 provides information, such as boot files, operating system images, and applications to one or more of client electronic devices 610, 612, and 614. Client electronic devices 610, 612, and 614 may be referred to as "clients" with respect to a server such as server computer 604. Network data processing system 600 may include more or fewer servers and clients or no servers or clients, as well as other devices not shown.

Client smart device 614 may include any suitable portable electronic device capable of wireless communications and execution of software, such as a smartphone or a tablet. Generally speaking, the term "smartphone" may describe any suitable portable electronic device having more advanced computing ability and network connectivity than a typical mobile phone. In addition to making phone calls (e.g., over a cellular network), smartphones may be capable of sending and receiving emails, texts, and multimedia messages, accessing the Internet, and/or functioning as a web browser. smart devices (e.g., smartphones) may also include features of other known electronic devices, such as a media player, personal digital assistant, digital camera, video camera, and/or global positioning system. smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and other devices to form a mobile network where information can be exchanged.

Program code located in system 600 may be stored in or on a computer recordable storage medium, such as persistent storage 508 described above, and may be downloaded to a data processing system or other device for use. For example, program code may be stored on a computer recordable storage medium on server computer 604 and downloaded for use to client 610 over network 602 for use on client 610.

Network data processing system 600 may be implemented as one or more of a number of different types of networks. For example, system 600 may include an intranet, a local area network (LAN), a wide area network (WAN), or a personal area network (PAN). In some examples, network data processing system 600 includes the Internet, with network 602 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 600 may be referred to as a "cloud." In those examples, each server 604 may be referred to as a cloud computing node, and client electronic devices may be referred to as cloud consumers, or the like. FIG. 13 is intended as an example, and not as an architectural limitation for any illustrative embodiments.

ADDITIONAL EXAMPLES AND ILLUSTRATIVE COMBINATIONS

This section describes additional aspects and features of integrated inventory and shipping management systems and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

B0. A computer system for managing the storage and delivery of a plurality of physical goods, the system comprising:

at least one processor;

at least one storage device;

a data store stored in the at least one storage device; and a management program including a plurality of instructions stored in the at least one storage device and executable by the at least one processor to:

add first information relating to a first physical good to the data store using a first software module, wherein the first information includes indication of a packaging tier structure of the first good;

add second information relating to a second physical good to the data store using the first software module, wherein the second information includes indication of a packaging tier structure of the second good that is different than the packaging tier structure of the first good;

query the data store to generate a single table including selected identifying information relating to the first good and the second good; and using a second software module, record delivery information relating to the first good and the second good by updating the first information and the second information in the data store.

B1. The system of B0, wherein the indication of the packaging tier structure of the first good includes a measurement category selected from a group comprising goods measured in rolls and goods measured in eaches.

B2. The system of B1, wherein the indication of the packaging tier structure of the first good includes a measurement category selected from a group comprising goods measured in linear feet.

B3. The system of B0, wherein the first software module and the second software module are configured to communicate with each other only via the data store.

B4. The system of B0, wherein the data store is stored in a first storage device and the plurality of instructions are stored in second storage device.

B5. The system of B0, wherein the plurality of instructions are further executable to present a user interface that changes dynamically in response to user selection of a goods measurement category.

B6. The system of B5, wherein the user interface includes a hideable portion requesting additional information relating to the packaging tier structure.

B7. The system of B5, wherein input fields are automatically adjusted based on the selected goods measurement category.

B8. The system of B0, wherein the plurality of instructions are further executable to generate a bill of lading including the single table.

C0. A computer system for managing the storage and shipping of an inventory of physical goods, the system comprising:

a processor;

a memory; and a management program including a plurality of instructions stored in the memory and executable by the processor to:

receive one or more pieces of inventory by adding information relating to each of the one or more pieces of inventory into a central data store;

respond to a change request by changing the information relating to at least one of the pieces of inventory by updating the central data store; and respond to a receipt of a delivery confirmation signature by recording delivery of the at least one piece of inventory by updating the central data store;

wherein the central data store is a single, common data store accessible by all portions of the management program.

D0. A system for managing an inventory of goods, the system comprising:

a plurality of software modules including a warehouse management module, an inventory management module, and a delivery management module all operable within a control framework;

a common data store in communication with each of the software modules, such that each of the software modules is in indirect communication with the other software modules only through the data store, the data store being configured to store records associated with pieces of inventory; and a user interface through which an end user can interact with one or more of the plurality of software modules to manipulate the records stored in the data store.

D1. The system of D0, wherein each of the software modules is isolated from direct communication with each of the other software modules.

D2. The system of D0, wherein the plurality of software modules and the control framework are distributed over a network.

D3. The system of D2, wherein the network comprises the Internet.

D4. The system of D0, wherein the system is provided as a software-as-a-service (SaaS) product.

D5. The system of D0, wherein the common data store includes a mySQL or equivalent database.

D6. The system of D0, wherein the user interface includes a mobile electronic device having a bar code scanner.

D7. The system of D0, wherein the user interface includes an electronic tablet configured to record an image of a delivery acceptance signature.

D8. The system of D7, wherein the tablet is in communication with the system, such that the image of the signature is substantially immediately uploaded to the data store.

D9. The system of D0, wherein the user interface includes an electronic tablet configured to provide a manifest for routing a delivery driver to the customer's location, to track the goods for delivery, and to deliver the goods to the customer.

D10. The system of D0, the plurality of software modules further including a contact management module for managing information associated with customers and vendors.

D11. The system of D10, wherein the information associated with customers and vendors is maintained in one or more tables of the common data store.

E0. A computer-implemented method for managing an inventory of goods, the method comprising:

managing warehouse-related information related to a plurality of selected goods using a first dedicated software module in native communication with a central data store;

managing inventory-related information related to the selected goods using a second dedicated software module in native communication with the central data store; and managing delivery-related information related to the selected goods using a third dedicated software module in native communication with the central data store;

wherein the first, second, and third software modules are incorporated into a common web-based framework.

E1. The method of E0, wherein the first, second, and third software modules are configured to communicate with each other only via the central data store.

E2. The method of E0, wherein the central data store comprises a mySQL or equivalent database.

E3. The method of E0, wherein managing delivery-related information comprises capturing a delivery confirmation signature using an electronic tablet.

E4. The method of E3, further including recording an electronic image of the signature in the central data store, and the signature image is correlated with a specific one of the selected goods.

E5. The method of E0, further including accessing at least one of the dedicated software modules through a web-based user interface.

Advantages, Features, Benefits

The different embodiments and examples of the inventory and shipping management systems and methods described herein provide several advantages over known solutions. For example, illustrative embodiments and examples described herein integrate the different software modules via a central database. Accordingly, the modules are not required to update each other using an API or other data transfer method. For example, known solutions have software for Warehouse and Inventory Management separate from software for Trucking and Delivery systems. This requires interfacing between the two separate programs to be done via an API, separate manual data entry, or the creation of standardized files to distribute the information between the programs. This is cumbersome, time consuming, and may result in errors in either direction.

Furthermore, by integrating the modules through a central database, all related modules are instantly updated. For example, the Warehouse Management module may receive an incoming trip of numerous goods that are stored in the warehouse and made ready for delivery to end consignees (customers). Each of these goods has an end consignee address associated with it. This information, the location in the warehouse, and other associated information is stored in the database. When delivery is required for a set of goods to the end consignee, the Trucking and Delivery module does not need to obtain this information. The module already has it because of its integration with the same central database. It is therefore very easy for a user to compile all the goods for specific trucking routes onto a truck for delivery to end consignees and to create a Driver Manifest integrated with an electronic Driver Tablet.

Similarly, whatever occurs with the goods, e.g., status updates such as "Being Delivered" or "Delivered" (along with proof of delivery such as a signature image) are instantly available back to the Warehouse Management module, again with no program API interface, files, or manual user interface necessary.

Additionally, and among other benefits, illustrative embodiments and examples described herein have a dynamic and automatically adjusting UI. With Inventory Management, known software packages handle different types of goods separately. Therefore, carpet is handled in one group and pallets of items in another group. This results in either a very confusing UI, or multiple UIs (one for each type of good), which is time consuming and prone to error. Having the system keep track of the types of goods automatically and adjust the UI for a particular type makes data entry very simple and allows the system to combine different types of goods on one Bill of Lading (BOL) or Proof of Delivery (POD) instead of several. For the POD, this allows one signature to reflect the delivery of multiple types of goods.

Additionally, and among other benefits, illustrative embodiments and examples described herein allow a warehouse to act as a virtual storefront for its customers. Using the Pick and Pack process, goods may be picked up or delivered to the primary customer's customers with no more than a purchase order.

Additionally, and among other benefits, illustrative embodiments and examples described herein include multiple separate modules that can talk with each other, and which can be sold separately as options to the main system. When purchased and enabled, each module is instantly integrated with the existing module(s) with no manual interface required. For instance, if the initial module is Warehouse Management, this can be operated as a stand-alone program. However, if it is decided later to purchase the Trucking and Delivery module, this new module is instantly interfaced into the initial module by telling the system that the new module is active.

Benefits to the seller of the software include that modules may be sold separately for additional revenue, because each can operate as a "stand-alone" product. Benefits to the buyer of the software include simplified customization, because a single module (e.g., Warehouse Management) can be purchased and used. If that buyer decides later to add the Trucking and Shipping module, no changes have to be made to the initial Warehouse Module. The new module is instantly added with full integration to all data.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A computer system for managing the storage and delivery of a plurality of physical goods, the system comprising:
   at least one processor;
   at least one storage device;
   a data store stored in the at least one storage device; and
   a management program including a plurality of instructions stored in the at least one storage device and executable by the at least one processor to:
   add first information relating to a first physical good to the data store using a first software module, wherein the first information includes indication of a packaging tier structure of the first good;
   add second information relating to a second physical good to the data store using the first software module, wherein the second information includes indication of a packaging tier structure of the second good that is different than the packaging tier structure of the first good;
   query the data store to generate a single table including selected identifying information relating to the first good and the second good; and
   using a second software module, add delivery information relating to the first good and the second good by updating the first information and the second information in the data store;
   wherein the first software module and the second software module are configured to communicate with each other only via the data store.

2. The system of claim 1, wherein the indication of the packaging tier structure of the first good includes a measurement category selected from a group comprising goods measured in rolls and goods measured in eaches.

3. The system of claim 2, wherein the indication of the packaging tier structure of the first good includes a measurement category selected from a group comprising goods measured in linear feet.

4. The system of claim 1, wherein the data store is stored in a first storage device and the plurality of instructions are stored in second storage device.

5. The system of claim 1, wherein the plurality of instructions are further executable to present a user interface that changes dynamically in response to user selection of a goods measurement category.

6. The system of claim 5, wherein the user interface includes a hideable portion requesting additional information relating to the packaging tier structure.

7. The system of claim 5, wherein input fields are automatically adjusted based on the selected goods measurement category.

8. The system of claim 1, wherein the plurality of instructions are further executable to generate a bill of lading including the single table.

9. The system of claim 1, wherein using the second software module to add delivery information relating to the first good and the second good includes capturing an electronic image of a delivery acceptance signature, and adding the electronic image to the data store, using the second software module.

* * * * *